Nov. 30, 1965

M. W. DOWNEY ETAL 3,220,695

PUSH-BUTTON DRAIN VALVE

Original Filed Oct. 13, 1961

INVENTORS.
Martin W. Downey
Lloyd K. Jones
BY

THEIR ATTORNEYS

INVENTORS.
Martin W. Downey
Lloyd K. Jones

THEIR ATTORNEYS

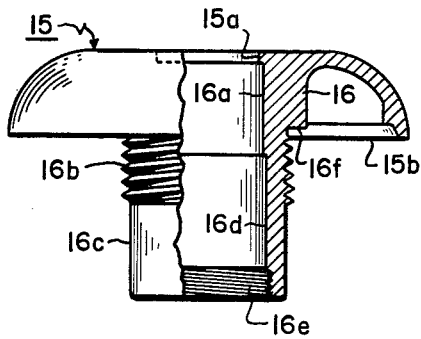
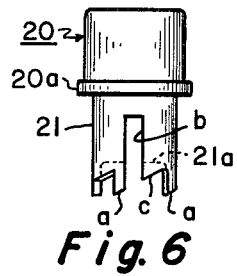
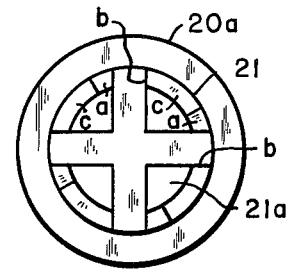
Fig. 5  Fig. 6  Fig. 7
Fig. 8
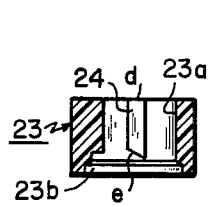
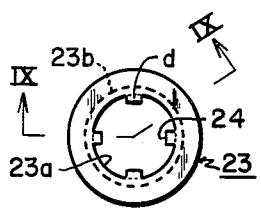
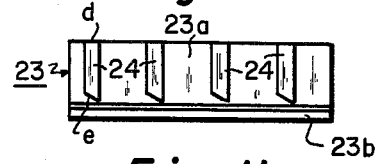
Fig. 9  Fig. 10  Fig. 11
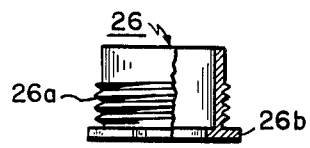
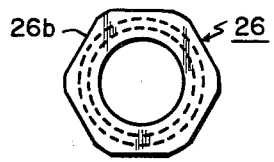
Fig. 12  Fig. 13
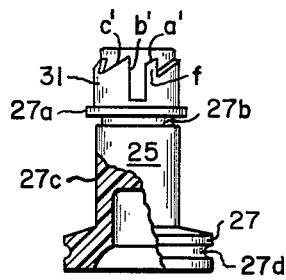
Fig. 14  Fig. 15
INVENTORS.
Martin W. Downey
Lloyd K. Jones
BY
THEIR ATTORNEYS Nov. 30, 1965  M. W. DOWNEY ETAL  3,220,695
PUSH-BUTTON DRAIN VALVE
Original Filed Oct. 13, 1961  5 Sheets-Sheet 4

INVENTORS.
Martin W. Downey
Lloyd K. Jones
BY
Green, McCallister & Miller

THEIR ATTORNEYS

INVENTORS.
Martin W. Downey
Lloyd K. Jones
BY Green, McCallister & Miller
THEIR ATTORNEYS

United States Patent Office 3,220,695
Patented Nov. 30, 1965

3,220,695
PUSH-BUTTON DRAIN VALVE
Martin W. Downey and Lloyd K. Jones, Morgantown, W. Va., assignors to Sterling Faucet Company, Morgantown, W. Va., a corporation of West Virginia
Continuation of application Ser. No. 144,931, Oct. 13, 1961. This application Apr. 30, 1965, Ser. No. 453,567
17 Claims. (Cl. 251—263)

This application is a continuation of our copending application Serial No. 144,931, filed October 13, 1961, now abandoned, and entitled, Push-Button Drain Valve.

This invention relates to a push-in or in-movement operated device for moving a position-change element or part, such as a closure or valve part, between longitudinal-axial "in" and "out" or opened and closed positions and more particularly, to a push-button-operated, cam-controlled valve device.

Another phase of our invention relates to a position-change device or mechanism which is positively operated by force applied in one axial or longitudinal direction through the agency of indexing, cam, and resilient or spring means to effect a partial turning or rotative movement of a position-change or valve part to move and retain such part alternately between "in" and "out" or a pair of different axial positions.

This invention has been developed and, for the purpose of illustration, will be particularly shown as applied to a drain or waste valve device or mechanism which can be alternately opened and closed by successive, simple, push-in movements effected by the hand or foot of the operator and which is particularly suitable for bath tub and shower drains, basket sink drains, wash basin and laundry tub drains, etc.

There has been a need for a drain valve which will be sanitary, that is semi-automatic in its operation, and that will be fully fool-proof, positive and efficient in its opening and closing actions. Heretofore, a drain valve, such as used for a bath tub, has required a relatively complex mechanism which extends along the bottom of the tub and connects with a vertical operating lever means that has an extending handle that is operated from a position above the tub. Such a type of mechanism has been the standard mechanism for operating bath tub drain valves, although there have been various attempts to provide a so-called latching type of plug valve which may be directly operated by positive "in" and "out" movements of a plug. However, such attempts have not provided a valve that is fully positive and fool-proof in its construction and operation and sanitary in its usage.

It has been an object of our invention to devise a solution to the problem presented and particularly, from the standpoint of a device which may employ enclosed operating parts and is positive and fool-proof in its operation;

Another object of our invention has been to develop a new and improved type of position-change mechanism which may be operated by a single direction or "in" type of movement;

A further object of our invention has been to devise a drain valve mechanism of a semi-automatic type which employs indexing, cam and resilient or spring means for accomplishing opening and closing movements of a valve part by successive, simple, push-in movements of a push-in operating or button part;

These and other objects of our invention will appear to those skilled in the art from the illustrated embodiment, the description and the claims.

In the drawings, FIGURE 1 is a vertical section in elevation through a device or mechanism embodying the principles of our invention that is in the nature of a push button drain valve; this figure is scaled to about twice the size of a commercial product and shows the device in its closed position;

FIGURE 5 is a vertical view in elevation on the scale of FIGURE 3 and in partial section of a main housing body having cap and boss or cartridge portions and which is adapted to be removably assembled with the part of FIGURE 3;

FIGURE 6 is a vertical view in elevation on the scale of FIGURES 3 and 5 of an operating, push-button, back or top cam and indexing part that is adapted to be operatively carried by the housing body of FIGURE 5;

FIGURE 7 is an enlarged bottom end or plan view of the push-button or operating part of FIGURE 6;

FIGURE 8 is a side development of indexing slot and cam portions of the part of FIGURES 6 and 7;

Figure 1:
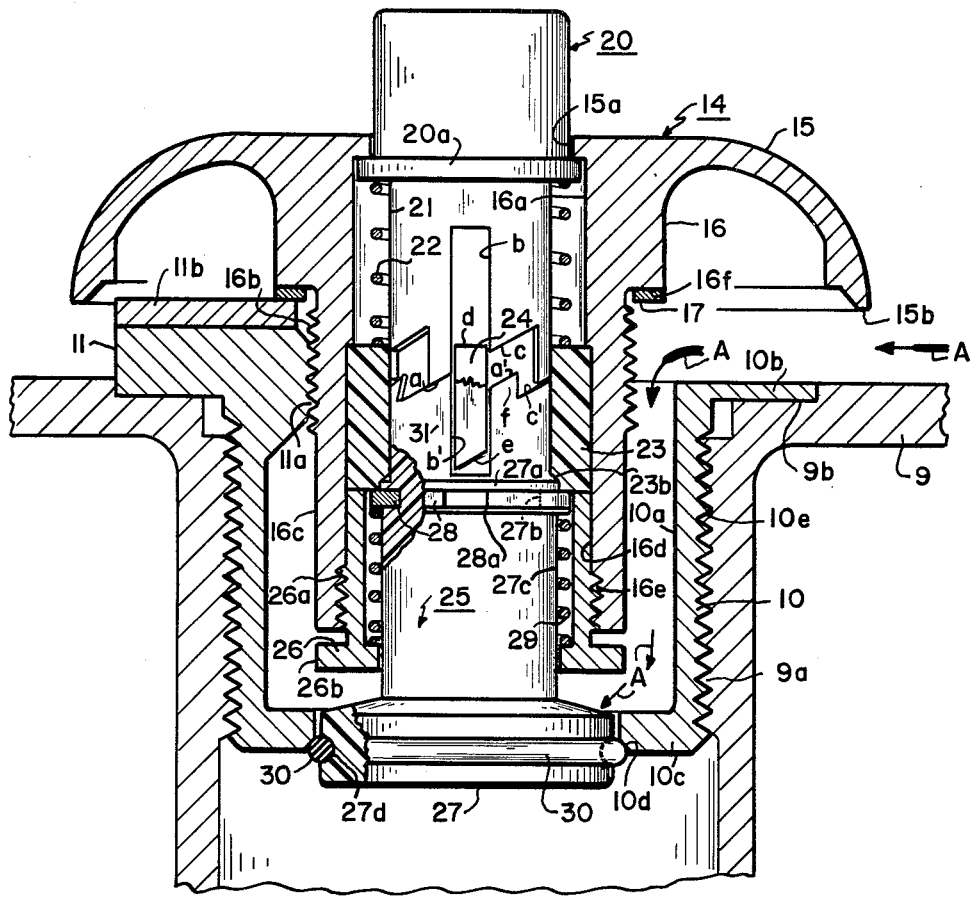
Figure 2:
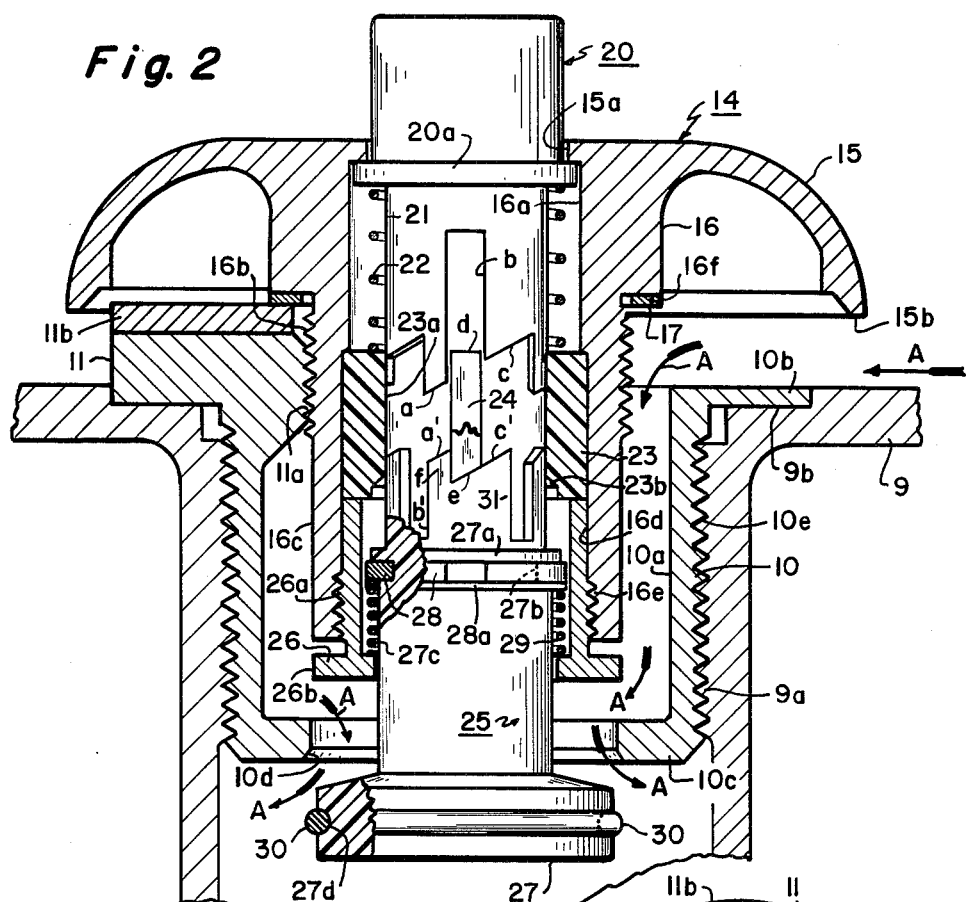
FIGURE 2 is a view similar to FIGURE 1 of the device of and on the scale of FIGURE 1 showing it in an "open" or fluid-draining position.
Figure 3:
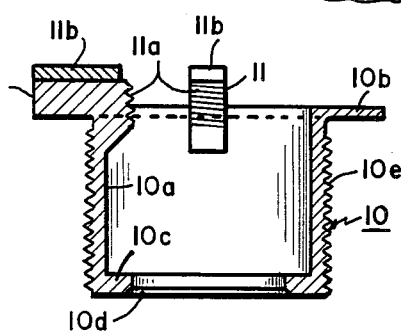
FIGURE 3 is a reduced (actual commercial size) sectional view in elevation showing details of the construction of a valve-seating drain fitting, outer housing part or strainer plug part of the device of FIGURES 1 and 2; this figure is taken along the line III—III of FIGURE 4.
Figure 16:
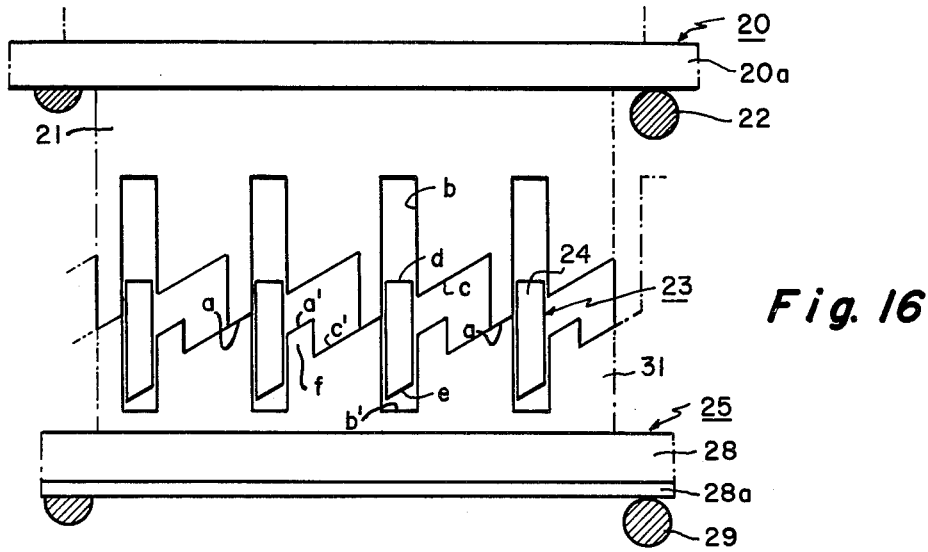
Figure 17:
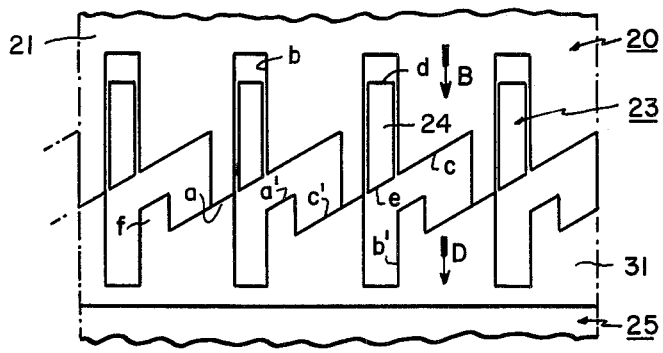
Figure 18:
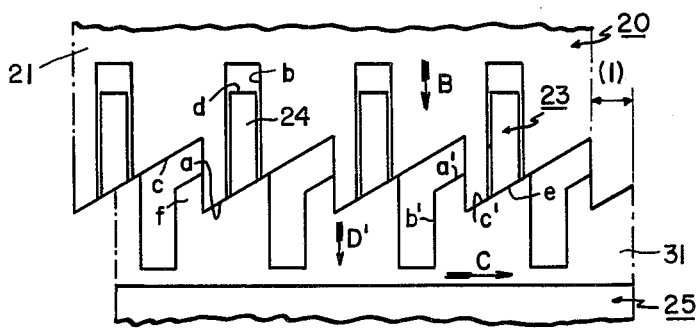
Figure 19:
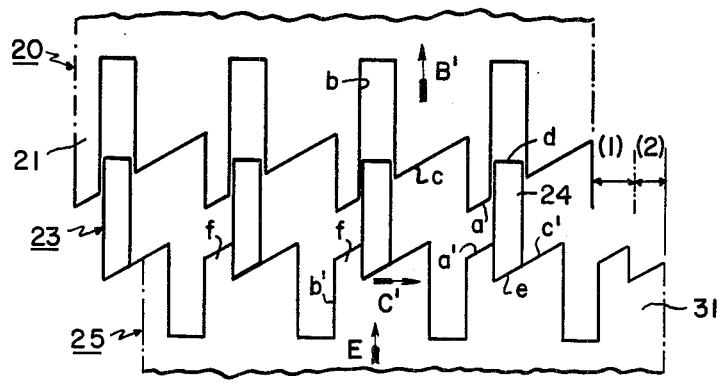
Figure 20:
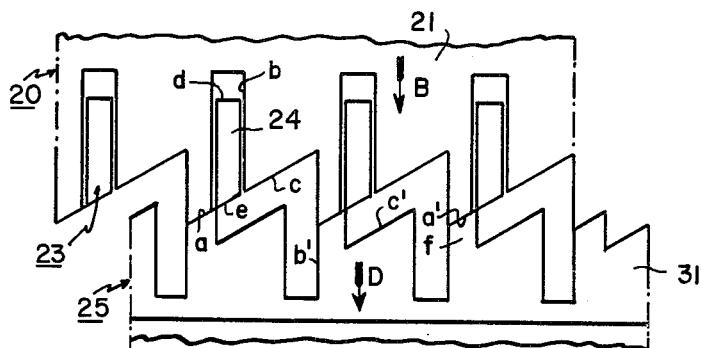
Figure 21:
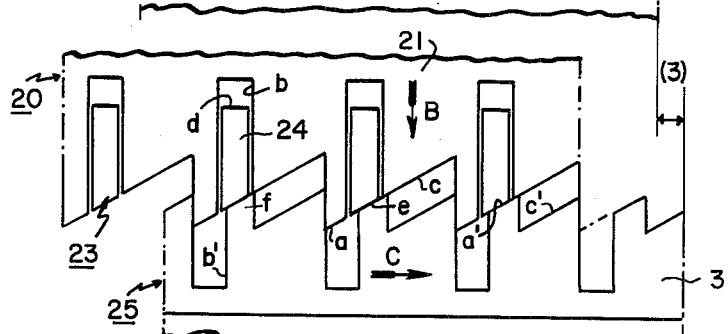
Figure 22:
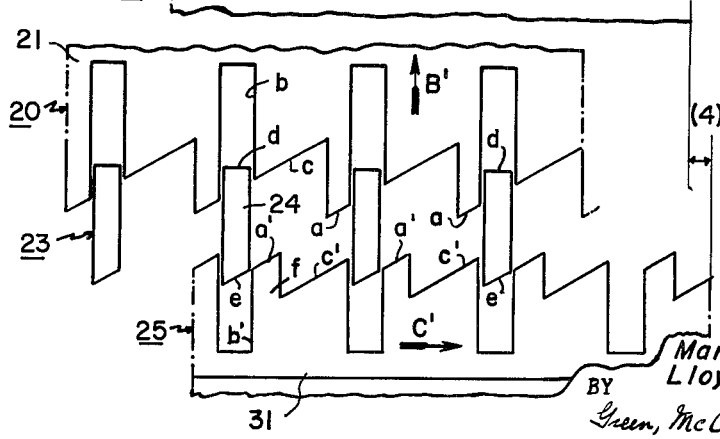

FIGURE 9 is a vertical section in elevation on the scale of FIGURES 3, 5 and 6 of a control, retaining bushing, intermediate sleeve, or indexing key part of the device of FIGURES 1 and 2 which is adapted to cooperate with an inner end of the operating or push-button part of FIGURES 6 and 7; this view is taken along the line IX—IX of FIGURE 10;

FIGURE 10 is a top plan view on the same scale as end of the control or sleeve part shown in FIGURE 9;

FIGURE 11 is a development of the inside bore looking from the outside of the control or sleeve part of FIGURE 9 showing indexing key and cam edge or face portions thereof;

FIGURE 12 is a vertical view in partial section on the scale of FIGURE 9 of a retaining nut or mounting sleeve part of the device of FIGURES 1 and 2 which is adapted to removably position the parts of FIGURES 6, 9 and 14 within the housing body of FIGURE 5;

FIGURE 13 is a bottom plan or end view on the scale of and of the part of FIGURE 12;

FIGURE 14 is an elevation partially in section of a position-change or valve part on the same scale as FIGURE 12;

FIGURE 15 is a development of camming, latching and indexing slot portions of the part of FIGURE 14;

FIGURES 16 to 22, inclusive, are double-scale developments of cooperating camming, indexing key, latching and slot portions of the part of FIGURES 6, 9 and 14, illustrating the operating of the mechanism or device of FIGURES 1 and 2;

The development of FIGURE 16 shows the relation when the device is in its closed position of FIGURE 1;

The development of FIGURE 17 shows the relative positioning of the parts and their cooperating portions when the push-button or operating part of FIGURES 6 and 7 has been initially moved forwardly or pushed inwardly from the starting position of FIGURE 16 to move the position-change or valve part out of an indexing and latched relation with the control or intermediate sleeve part;

The development of FIGURE 18 shows the relationship of the parts and their cooperating portions when the push-button or operating part of FIGURES 6 and 7 has been moved or pushed further inwardly within the housing body of FIGURE 5 and is near the end of its "in" stroke, and at which time the position-change part of FIGURE 14 has turned or rotated a distance indicated by (1);

The development of FIGURE 19 shows the relationship of the parts and their cooperating portions when the push-button or operating part of FIGURE 6 has been moved fully-inwardly or to the end of its forward, "in" or "down" stroke and has been released and is starting to move upwardly or on its return "out" or "up" stroke; in this figure, the position-change part of FIGURE 14 has turned or rotated an additional distance (2) and has moved forwardly, outwardly or downwardly to its fully open position of FIGURE 2 and in a latched, indexing relation with the control or sleeve part;

The development of FIGURE 20 shows the relationship of the parts and their cooperating portions when the push-button or operating part of FIGURE 6 is subsequently being initially pushed-in for unlatching the position-change part of FIGURE 14;

The development of FIGURE 21 shows the relationship of the parts and their cooperating portions when the push-button or operating part of FIGURE 6 is being pushed or moved inwardly or forwardly further in its "down" stroke and, at which time, the valve or position-change part of FIGURE 14 has been moved forwardly or outwardly and has turned or rotated a distance indicated by (3);

And, the development of FIGURE 22 shows the relation of the parts and their cooperating portions when the push-button or operating part of FIGURE 6 has been moved fully to the end of its forward or "down" stroke, a further turning movement (4) has been effected upon the position-change part of FIGURE 14, the operating part has been released and is starting its return movement, and after the position-change part has started to move upwardly, backwardly or inwardly to its original starting position of FIGURE 16, at which time it fully closes-off fluid flow (see FIGURE 1).

Referring particularly to FIGURES 1 and 2 of the drawings, we have shown a device or mechanism employing the principles of our invention in a mounted position with respect to an open drain portion of a tub, vessel or bowl 9. An outer sleeve-like housing or open-end plug-like part, valve-seating drain fitting or strainer plug 10 is shown as having an inner bore 10a, a top positioning flange 10b and a bottom flange 10c. External or male threads 10e cooperate with a corresponding threaded bore 9a of the drain portion to removably mount the part 10 with its annular top flange 10b in a "flush" position within a flanged recess 9b about the bore 9a of the open drain portion.

Figure 4:
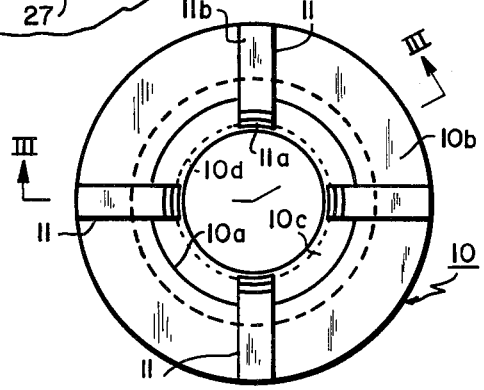
FIGURE 4 is a top plan view on the same scale as and of the part of FIGURE 3.

As shown particularly in FIGURE 4, a group or set of four, quadrant-positioned, radially-inwardly-projecting, peripherally spaced-apart, top ledges or fingers 11 extend upwardly beyond the upper face of the flange 10b and radially-inwardly beyond the bore 10a and are provided with female threads 11a to cooperate with male threads 16b of a centrally-downwardly-depending boss or cartridge portion of a main housing body 14. Annular bottom flange 10c projects radially-inwardly from the lower end of the part 10 beyond its bore 10a to define an outflow opening or passageway for drain water from the device when the valve is in its open position. The bottom flange 10c has a frusto-conical or beveled, outwardly-diverging, seating surface, edge or valve seat portion 10d for receiving a resilient, sealing, O-ring gasket 30 carried by an enlarged closure valve head portion 27 of a valve or position-change part 25 for closing-off the drain passageway.

The main housing body part 14 has an outwardly downturned, rounded or inverted, top, cup-shaped flange or cap portion 15 which is adapted, at its outer under edge 15b, to define main drain openings or passageways with respect to the flange 10b and between the fingers 11. The edge 15b may further define a relatively narrow annular passageway or spacing along the top, outer edges upwardly-projecting, inwardly-offset ledge portions 11b of the fingers 11, see the left hand portion of FIGURES 1 and 2 of the drawings.

A thickened boss, sleeve or cartridge body portion 16 projects centrally-downwardly or inwardly from the top cup portion 15 and has an enlarged bore 16a with respect to bore 15a of the portion 15 to define an annular retention shoulder or ledge for an intermediate or central ring flange or annulus portion 20a of an operating, push-button or back-top-cam part 20. The boss 16 further defines an under-abutment face or shoulder 16f which is adapted to engage a bearing ring or washer 17 which abuts inner reaches of the upper faces of the ledge portions 11b of the fingers 11.

The cartridge or lower sleeve portion 16c of the boss 16, is of cylindrical shape, projects downwardly therefrom and has a slightly enlarged lower bore 16d with respect to the upper bore 16a to axially-longitudinally-slidably receive the control, retainer bushing or intermediate sleeve part 23 and a removable, retaining sleeve, nut or mounting part. The sleeve 16c contains control means for locating a valve member 27 in either an open or closed position as selected by a depression and release of the push button 20. Female threads 16e in the lower end of the bore 16d are adapted to cooperate with corresponding threads 26a of the part 26. The retaining nut or sleeve part 26 has a wrench flat or grip flange 26b for securely mounting it in and also for releasing it from its mounted position with respect to the portion 16c.

As previously mentioned, the push-button or operating part 20 has an annular flange 20a which cooperates with the ledge defined by the bore 15a to retain it in an operating position with respect to the cap 15 or top or back end portion of the housing body 14. The push-button part 20 has a rounded annular or cylindrical cam, boss, plug or inner end portion 21 of smaller diameter projecting forwardly-inwardly from its flange 20a to cooperate with the intermediately-positioned control or sleeve part 23. As shown in FIGURES 6 and 7, four inner ledges 21a of the plug portion 21 define a cruciform shape of means of cross and longitudinally-axially-extending, rather deep, open-end indexing slots b. Vertically or axially-offset, sloped, cam edges or faces a and c of about a 30° slope (see also FIGURES 6, 7 and 8) are provided on the bottom or forward edges of the portion 21 and define teeth at the inner end portion of the part 20.

A spiral tension spring or resilient means 22 fits about the portion 21 and between its outer periphery and the inner bore 16a of the boss 16 (see FIGURE 1) to in compression abut the flange 20a at its upper end and the back end of the sleeve part 23 at its lower end and resiliently urge the push-button part 20 to its outer, back or normal position of FIGURES 1 and 2. The sleeve part 23 serves as an intermediate, slip or slide-over, cooperating part between the plug or inner portion 21 of the push-button part 20 and a rounded, annular, cylindrical, plug, boss or inner end portion 31 of the position-change, valve or cam part 25. As shown in FIGURES 9, 10, and 11, the sleeve part 23 has a bore 23a provided with four-quadrant-located, longitudinally axially or vertically-projecting indexing key portions 24. At its under or lower side, the bore 23a is enlarged or beveled outwardly to provide an end bore 23b which is adapted to cooperate with and fit over an intermediate ring flange or annular ledge portion 27a of the position-change or valve part 25, see FIGURE 1. It will be noted that the key portions 24 have upper, planar ends or edges d and lower, sloped, cam ends, faces or edges e which also may have a 30° angular relationship which corresponds to the cam ends or faces a and c of the part 20.

The body of position-change or valve part 25 has an annular, cylindrical or plug-like lower or forwardly or outwardly-projecting end portion 27c which terminates in an enlarged annular valve member or seating portion 27. The portion 27 is provided with a central, annular recess, or groove 27d to receive sealing ring 30, such as a resilient resin O-ring, which is normally resiliently-held in position therein. A ledge-defining, annular recess 27b, below the flange 27a (see FIGURE 14), is employed to receive a snap-on, spring latching element or split retaining ring part 28 (see FIGURE 1) for, with an annular washer ring 28a, holding a spiral tension spring or resilient means 29 in compression within a cavity defined by the outer wall of the portion 27 and the inner wall of the sleeve nut 26. It will be noted that the spring 29, at its upper end, is held in position by abutment with the annular washer ring 28a which, in turn, is held in position by the split retaining ring 28 and, at its lower end, abuts a radially-inwardly-projecting, annular, end-closing portion of the bottom flange 26b to normally urge part 25 inwardly, upwardly or backwardly towards the parts 23 and 20 and a valve-closing position. The annular washer ring 28a also serves as an inner guide surface member for relative upward movement of the sleeve nut 26 or forward-outward or downward movement of the position change part 25 within the sleeve nut 26 against the resiliency of the spring 29.

The position-change or valve part 25 also has an upper cylindrical or annular boss or inner plug end portion 31 (see FIGURES 14 and 15) that is provided with cross-aligned and relatively longitudinally-axially deep, open-end recesses or indexing slots b' in its outer peripheral area, that somewhat correspond to or are complementary with the slots b of the part 20. Offset, peripheral side portions of a radial depth of the slot b' define cam faces or ends a' and c' which somewhat correspond to and are complementary with the faces a and c of the part 20 and may, like such faces and the face e of the part 23, have a slope of about 30°. Although the slope of these cam faces or edges should be substantially the same with respect to each other, we have found the angles used for the cooperating edges may vary about 10° to 15° from 30° and still function in the device.

When the device is in its forward or outward "open" position of FIGURE 2, waste or drain water flows, as indicated by the arrows A, through the passageways defined by the spacing between the parts 14 and 10, along the spaced between the outside of the cartridge portion 16c and the inside of the fitting 10, and through a passageway or opening defined between valve head portion 27 and the flange 10c of the fitting 10. On the other hand, when the valve is in its inner or backward "closed" position of FIGURE 1, the sealing gasket 30 is in sealing engagement with the seating edge or surface 10d to prevent any water outflow through the opening or passageway of the bottom flange 10c.

The operation of the device is somewhat diagrammatically illustrated by development FIGURES 16 to 22, inclusive. In understanding the operation, it will be noted that the spring or resilient means 22, not only normally urges the operating or push-button part 20 to its upper or outer position of FIGURES 1 and 2, but also exerts longitudinal-axial resilient action or force up the sleeve part 23 to resiliently hold its forward or bottom end in abutment with an inner end of the mounting sleeve nut 26, to resiliently maintain the cooperating and indexing portions of the parts 20, 23 and 25 in an axially-longitudinally or endwise aligned, cooperating-operating relationship with each other. When the parts have been axially-assembled with each other and they are in their starting or initial relation, the slots b and b' are in alignment and in an indexing relation with the keys 24 (see FIGURE 16), after the mounting nut 26 has been screwed-down in its mounted position within the housing body 14. The spring 29 has the additional function of normally urging the position-change or valve part 25 within its mounting sleeve or nut 26 towards an upper, inner or backward position which is its closing position of FIGURE 1.

In FIGURES 16 to 22, inclusive, we have shown co-operating, cam and indexing slot portions of the cylindrical, boss or plug end portions 21 and 31 of the parts 20 and 25 and the indexing keys 24 of the sleeve part 23. FIGURE 16 shows the relationship of the three parts and particularly, with reference to their indexing and cam portions when the device is in its closed position of FIGURE 1, wherein the portion 31 of the valve part 25 is in its innermost or upward position. At this time, the first group of indexing slots b of the portion 21 of the push-button part 20 are vertically or longitudinally-axially aligned with corresponding or opposed indexing slots b' of the portion 31 of the valve part 25 and are held in alignment by the overlapping-extending and indexing relationship of the keys 24 within such aligned slots. Also, the plug portion 21 of the push-button part 20 is partially within the bore of the sleeve part and the plug portion 31 of the valve part 25 is within the bore of the sleeve part and its backwardly-offset camming edges or faces c' are in end or edge abutment (within the sleeve part 23) with forwardly-extending camming edges or faces a of the push-button part 20. The inner positioning of the portion 31 of the part 25 of FIGURE 16 and of the portion 21 of the part 20 is assured by the resilient, and opposed force actions of the compressed springs 22 and 29.

In FIGURE 17, the operator has initially pushed the plug or cam end portion 21 of the part 20 inwardly or downwardly within the sleeve part 23 against the resiliency of the spring 22 (see arrow B) to a position such that the keys 24 lie substantially fully within the slots b and their sloped cam faces or edges e are in alignment with or behind the sloped cam edges c of the portion 21 of the part 20. That is, the part 20, in its forward or downward stroke pushes the part 31 out of an indexing relation (see arrow D) with the keys 24 of the part 23, while the part 31 is still in indexing alignment with the slots b and the keys 24. It will be noted in the construction illustrated, that the peripheral spacing between adjacent keys 24 of the part 23 and adjacent indexing slots b of the part 20 and adjacent indexing slots b' of the part 25 is 90°, since they are arranged in a quadrant relationship on their respective parts.

In the position of FIGURE 16, the springs are normally urging the portion 31 of the part 25 inwardly or upwardly towards the parts 23 and 20, but the engagement of the opposed and abutting camming surface edges a and c' limits the maximum "in" movement between part 25 and the parts 23 and 20. However, in the position of FIGURE 17, the part 25 and its portion 31 are free to turn or move to the right of FIGURE 17, since the keys 24 clear the slots b' and the camming edges a'. Thus, on a slight further forward or inward movement of the part 20 on the part 25 (see arrow D' of FIGURE 18), the spring pressure becomes so great that the valve part 25 and its portion 31 rotate (see arrow C) a distance indicated by (1) of FIGURE 18. In other words, the camming faces or edges c' move along the camming faces c to pass the camming faces e of the keys 24 and thus, move the indexing slots b' out of alignment with the keys 24 and with the indexing slots b. On a slight release of the push-in movement (see the arrows B' and E of FIGURE 19) of the part 20 and its portion 21 on the part 25 and its portion 31, the part 25 completes its turning movement (see arrow C') for the distance of (2) shown in FIGURE 19, at which time, the keys 24 are in a retained or latched, forward or lowermost position within a second set or group of indexing slots defined by the camming edges c' and abutment teeth f of the portion 31. This represents the retained forward, outward or open position of the part 25 and its portion 31, as effected by a total turning or rotative movement of (1) plus (2) or 45°.

FIGURE 19 shows the position of the push-button part 20 and its portion 21 when it has been fully released and forced by the spring 22 to its normal outer position of FIGURE 1, by a continuation of movement indicated by the arrow B' of FIGURE 19. It will be noted that, in all the positions of FIGURES 16 to 19, the keys 24 are in indexing alignment with the slots *b* of the part 20, but that the relationship of the valve part 25 with respect to the keys 24 changes, due to its rotative movement, as effected by the combined utilization of spring force and the sloped, cooperating, camming surfaces or edges. In other words, the resilient force causes a partial and controlled turning movement of the part 25 to relieve the maximum force exerted by such force action. In FIGURES 17 to 19, we have indicated inward movement of the part 20 by the arrow B, outward movement of the same part by the arrow B', initial rotation of the part 25 by the arrow C, and final rotative or turning movement of the part 25 by the arrow C'. The outward movement of the part 25 is indicated by the arrow D in FIGURE 17; further outward movement is indicated by the arrow D' of FIGURE 18. Slight inward movement of the part 25 is indicated by the arrow E of FIGURE 19.

In FIGURES 20 to 22, we have illustrated the operation of the device when the push-button part 20 is again moved inwardly for causing the valve part 25 to move to its inward or closed position. The initial push-in or forward pressure stroke on the part 20 (see the arrows B and D) is illustrated in FIGURE 20, wherein the keys 24 of the part 23 lie fully within the indexing slots *b*, and their bottom inclined cam edges *e* substantially align with the cam edges *c* of the part 20 and with the second group of indexing slot portions of the part 25. This relationship corresponds to the relationship of FIGURE 17 as to the parts 20 and 23. As the inward push-in movement, as indicated by the arrow B of FIGURE 21 is continued, the valve part 25, in endeavoring to relieve the spring-exerted force upon it, moves or turns (see arrow C) a distance (3) of this figure, such that its teeth *f* are in substantial alignment with and its second group of indexing slots are out of alignment with the keys 24 of the part 23. At this time, the cam edges *a'* slide along the cam edges *a* from the position of FIGURE 20 to that of FIGURE 21.

On a slight release of the final depressing or inward stroke movement of the part 20 (see arrow B'), the part 25 turns (see arrow C') a further distance (4) of FIGURE 22, such that its indexing slots *b'* are now again aligned with the index slots *b* of the part 20 and thus, with the keys 24 of the part 23; at this time, the cam edges *a'* slide along the cam edges *e* from the position of FIGURE 21 to the position of FIGURE 22. In FIGURE 22, the push-button 20 has completed its inward movement and the push-in force has been fully released and is starting its full return movement; this will result in a return to the initial or starting relationship of the parts of FIGURE 16 when the push-button part 20 completes its outward or return stroke. It will be noted that the spring pressure or resilient force on the part 25 causes it to move inwardly or upwardly to register along the keys 24 and cause a closing of the valve, as indicated in FIGURE 2 of the drawings. The distance of turn or rotative movement of (3) plus (4) of FIGURES 21 and 22 is 45°. It is thus apparent that the valve part 25 turns a total of 90° in a complete cycle of operation, involving its movement between valve-opening and closing positions. In the views of FIGURES 1 and 2, we have shown the lower portion of the immediately opposing key 24 of the control or sleeve part 23 cut substantially vertically-centrally therethrough, particularly to illustrate that its cam edge *e* has the same direction of slope as the cam edges of the operating part 20 and the position-change part 25.

With reference to FIGURES 1 and 2, the fluid flow passageways defined by our construction and particularly by the relationship between the fitting 10, the cartridge portion 16c, and between the feet 11 and the cap 15, provide a strainer type of assembly for preventing the accidental flow-out of solid objects into the drain pipe. In addition, it will be noted that the operating parts of our construction are, in effect, enclosed within the cartridge portion 16c and are thus isolated from contamination. However, the parts of the device are removably mounted in position, so that they can be removed and disassembled for cleaning, if necessary.

The indexing, camming and rotative action of our construction is positive and fool-proof and is assured at all times, without any jamming of the parts, once they have been assembled and removably secured in position within the cartridge portion 16c of the part 14. The sealing relationship of the O-ring 30 when the valve of the part 25 is in its closing position of FIGURE 1 is enhanced by the compression of the spring 29 which is in a compressed relationship, even when the part 25 is in its inner or upper position. The sleeve part 23 serves, not only as an intermediate cooperating indexing part, but also serves to hold the parts 20 and 25, and the upper spring 22 in a cooperating relation within the cartridge portion 16c of the housing body 14.

What we claim is:

1. An improved drain valve construction for opening and closing-off fluid flow through an open drain portion which comprises, a fitting sleeve having means for mounting it within the open drain portion, housing means, means mounting said housing means in a radially-spaced relation within and along said sleeve to define a drain passageway therebetween, said sleeve having a valve seat thereon forming a portion of the passsageway, a push-button operatively-carried by said housing means and extending outwardly therefrom for substantially coaxial movement, valve means operatively-positioned by said housing means in a cooperating relation with said valve seat for movement into and out of a seating position therewith, control means operatively-positioned within said housing means in a substantially axially-aligned relation with said housing means, and said control means being constructed and arranged on depression and release of said push button for moving said valve means into a seating position with said valve seat from an unseated position with respect thereto and on an immediately sequential depression and release of said push button for moving said valve means from its seating position into an unseated position with respect to said valve seat.

2. An improved drain valve construction for opening and closing-off fluid flow through an open drain portion which comprises, a fitting sleeve having means for mounting it within and along the open drain portion, housing means, means mounting said housing means in a radially-spaced relation within and along said sleeve to define a drain passageway therebetween, said sleeve having a valve seat thereon forming a portion of the passageway, a push button operatively-carried by said housing means and extending outwardly therefrom for substantially coaxial inward and outward movement, valve means operatively-positioned by said housing means in a cooperating relation with said valve seat for movement into and out of a seating position therewith, control means operatively-positioned within a portion of said housing means in a substantially axially-aligned relation therewith, and said control means being constructed and arranged on depression and release of said push button for locating and retaining said valve means in a seated position with respect to said valve seat and on an immediately sequential depression and release of said push button for locating and retaining said valve means in an unseated position with respect to said valve seat.

3. A drain valve construction as defined in claim 2 wherein resilient means is carried within said housing means and cooperates with said control means to normally urge said valve means towards a seated position with respect to said valve seat.

4. A drain valve construction as defined in claim 2 wherein said control means has resilient means carried within said housing means and cooperating with said push-button to normally urge said push button to an outward position.

5. A drain valve construction as defined in claim 1 wherein, said control means is of multi-part construction and is operatively-carried within said housing means, and said control means has resilient means carried by said housing means and cooperating with the multi-parts of said control means for normally retaining said multi-parts in cooperative engagement with respect to each other.

6. A drain valve construction as defined in claim 2 wherein, said control means has a control sleeve operatively-positioned within said housing means, said control sleeve is provided with indexing means, and said control means has means projecting from said push button within said housing means and provided with indexing means that operatively-cooperates with said first-mentioned indexing means.

7. A drain valve construction as defined in claim 2 wherein said control means includes portions of said valve means and said push button that cooperate with each other to actuate said valve means when said push button is depressed and released.

8. A drain valve construction as defined in claim 2 wherein said control means has cooperating portions to actuate and turn said valve means when said push button is depressed and released.

9. A drain valve construction as defined in claim 2 wherein, said control means has force applying means operatively-carried within said housing means, and said control means includes a portion of said push button that cooperates with said force applying means to actuate said valve means when said push button is depressed and released.

10. A valving device for controlling fluid flow which comprises, a sleeve-like fitting having means for mounting it in position, sleeve-like housing means mounted in said fitting in a radially-spaced relation within and along said fitting to define a fluid flow of passageway therebetween, a valve seat about said fitting defining a portion of the passageway, a push button operatively-carried by said housing means for coaxial movement and extending outwardly therefrom beyond said fitting, valve means cooperating with said push button and operatively-carried by said housing means to extend outwardly therefrom for coaxial inward and outward movement, means carried by said housing means for normally urging said push button outwardly, and control means having portions cooperating with said push button for, on depression and release of said push button, locating and retaining said valve means in seating engagement with respect to said valve seat from an unseated position with respect thereto and for, on an immediately sequential depression and release of said push button, locating and retaining said valve means in an unseated position with respect to said valve seat.

11. Valving apparatus for controlling fluid flow comprising:
  (A) a fitting having a passageway therethrough, provided with mounting means and having:
    (a) a side wall,
    (b) sleeve means having at least a portion mounted within said fitting and spaced from said side wall,
    (c) a valve seat located on the fitting and forming a portion of the passageway,
  (B) a push button operatively supported by said sleeve means and extending outwardly therefrom for movement along the axis of said sleeve means,
  (C) a valve member positioned by said sleeve means in a coaxial cooperating relationship with respect to said valve seat, and
  (D) control means mounted within the portion of said sleeve means located within said fitting in a substantially symmetrical relationship with respect to the axis of said side wall, said control means being constructed and arranged on depression and release of said push button for locating and retaining said valve member in a valve seat engaging position from a non-engaging position and being responsive to an immediately-sequential depression and release of said push button for locating and retaining said valve member in a valve seat non-engaging position.

12. Drain control apparatus for controlling fluid flow through an open drain portion of a vessel for washing and the like comprising:
  (A) a drain fitting having a cylindrical side wall for secure positioning within the open drain portion of the vessel and having a valve seat portion that extends radially-inwardly from said side wall,
  (B) a cap part having a centrally located bore formed therein and having a hollow sleeve axially aligned with said bore,
  (C) means mounting said cap part in a spaced relationship with said drain fitting and said valve seat portion to form a drain passageway therebetween,
  (D) a push button operatively mounted within said cap portion and extending outwardly through said centrally located bore,
  (E) a valve member operatively mounted within said sleeve for cooperation with said valve seat portion, and
  (F) control means mounted within said sleeve and operatively connected to said push button and said valve member, for locating and retaining said valve member in a seated position from an unseated position with said valve seat portion in response to a depression and release of said push button, and for locating and retaining said valve member in an unseated position from the seated position with said valve seat portion in response to an immediately-sequential depression and release of said push button.

13. In a vessel having a wall that defines an open drain portion therein for receiving drain apparatus; improved drain control means for controlling fluid flow therethrough comprising:
  (A) a drain fitting securely mounted within the open drain portion of the wall, having spaced-apart wall portions defining a fluid flow passageway therealong, and having a valve seat portion about the fluid flow passageway,
  (B) a push button operatively positioned by and extending outwardly from said drain fitting for depression and release movement coaxially of said wall portions,
  (C) a valve member operatively-supported by said drain fitting in a cooperating relationship with respect to said valve seat portion, and
  (D) control means within said drain fitting constructed and arranged for locating and retaining said valve member in seated position from an unseated position with respect to said valve seat portion in response to a depression and release of said push button, and for locating and retaining said valve member in an unseated position from the seated position with respect to said valve seat portion in response to an immediately-sequential depression and release of said push button.

14. In a vessel having a wall that defines an open drain portion therein for receiving drain apparatus; improved drain control means for controlling fluid flow therethrough comprising:
  (A) a drain fitting securely mounted within the open drain portion,
  (B) a flanged cap mounted on said drain fitting and positioned in a spaced relation therewithin to define a substantially annular fluid flow passageway therebetween,
  (C) a valve seat portion positioned in the passageway and carried by said drain fitting, (D) a push button operatively supported by said drain fitting and extending outwardly through said flanged cap for inward and outward movement with respect thereto, (E) a valve member operatively carried by said drain fitting in a cooperating relationship with said valve seat portion, and (F) control means operatively positioned within said drain fitting and constructed and arranged for locating and retaining said valve member in a seating position from an unseated position with respect to said valve seat portion in response to a depression and release of said push button, and for locating and retaining said valve member in an unseated position from the seating position with respect to said valve seat portion in response to an immediately-sequential depression and release of said push button; and said control means having means for moving said push button outwardly on its release.

15. In a vessel having a wall that defines an open drain portion therein for receiving drain apparatus; improved drain control means for controlling fluid flow therethrough comprising:

(A) a drain fitting mounted within the open drain portion, having spaced wall portions defining a fluid flow passageway therewithin, and having a valve seat portion in the fluid flow passageway, (B) a push button operatively carried by and extending outwardly of said drain fitting for inward and outward movement with respect thereto, (C) a valve member operatively carried by said drain fitting in a cooperating relationship with respect to said valve seat portion, and (D) control means operatively positioned within said drain fitting and operatively connected to said push button and said valve member, for locating and retaining said valve member in a seated position from an unseated position with respect to said valve seat portion in response to a depression and release of said push button, and for locating and retaining said valve member in an unseated position from the seated position with respect to said valve seat portion in response to an immediately-sequential depression and release of said push button.

16. An improved valve construction suitable for opening and closing-off an open drain portion which comprises, a fitting constructed for removably mounting in the open drain portion and having a forwardly-positioned radially-inwardly projecting valve seating surface, a housing body having a cap portion at its back end, means carried by said fitting for removably mounting said housing body in a radially-spaced relation therewith to define a drain passageway therebetween, a push-button part operatively positioned within said housing body to project backwardly-outwardly therefrom, said push-button part having an intermediate flange for limiting its maximum backward-outward positioning within said housing body, said push-button part having an inner plug end portion, a sleeve part operatively positioned within said housing body forwardly of and in a cooperating relation with the plug end portion of said push-button part; said sleeve part having an inner diameter corresponding to an outer diameter of said plug end portion of said push-button part, so that said plug end portion may be moved into and out of said sleeve part; a first spring operatively positioned within said housing body part about the inner end portion of said push-button part and abutting between said intermediate flange and said sleeve part to normally urge said push-button part to its maximum backward-outward position within said housing body; a valve part having an inner plug end portion whose outer diameter substantially corresponds to the inner diameter of said sleeve part, so that said plug end portion may be moved inwardly within said sleeve part; said valve part having a valve head portion in a forwardly-projecting relation thereon and carrying a sealing gasket to engage with said seating surface of said fitting to close-off fluid flow through the passageway between said housing body and said fitting when said valve part is in an inner-backward position with said housing body, a second spring positioned within said housing body and cooperating with said inner plug end portion of said valve part to normally urge said valve part towards its inner-backward position with said housing body, a sleeve nut removably secured within the lower end portion of said housing body and extending inwardly therealong to define a positioning edge for a forward end of said intermediate sleeve part, said sleeve nut having a radially-inwardly projecting shoulder cooperating with said second spring to normally urge said valve part to its inner-backward position, the inner plug end portion of said push-button part having transversely and forwardly-open slot portions in a quadrant relation thereon and having sloped cam faces extending peripherally from said slot portions, said sleeve part having quadrant-positioned keys extending along its inner periphery to normally align with a first group of the slot portions of said push-button part, said sleeve part at forward end having sloped cam faces on said keys, the inner plug end portion of said valve part having transversely and backwardly-open slot portions in a quadrant relation thereon and having sloped cam faces extending peripherally from said slot portions, a first group of the slot portions of said valve part being constructed to align with said keys when said valve part is in its inner-backward position, the slot portions and cam faces of said push-button and valve parts being complementary with each other, a second group of the slot portions of said push-button part being forwardly-offset with the first group of slot portions thereof, a second group of slot portions of said valve part being backwardly-offset with the first group of slot portions thereof, the second group of slot portions of said push-button and valve parts defining latch teeth with their respective cam faces, said push-button part being constructed and positioned to be pushed forwardly-inwardly within said sleeve part when said keys are in an indexing relation within the first group of slot portions of said push-button and valve parts to move said valve part to a forward-outward open portion within said housing body until its first group of slot portions are out of an indexing relation within said sleeve part, said second spring being constructed and positioned to then turn said valve part with respect to said push-button and sleeve parts until the teeth of said valve part latch with and its second group of slot portions index on said keys to retain said valve part in its outer open position; said push-button part being constructed to be returned to its outer-backward position by said first spring; said push-button part being constructed to be again pushed forwardly-inwardly within said sleeve part to move said valve part forwardly-outwardly until said keys clear the teeth and second group of slot portions of said valve part; and said second spring being constructed and positioned to then turn said valve part until its first group of slot portions are in alignment with said keys and the first group of slot portions of said push-button part, so that upon a release of said push-button part, said springs will return said push-button and valve parts to their first inner starting positions and said keys will again index within the first groups of slot portions of said push-button and valve parts.

17. A valve construction as defined in claim 16 wherein, said valve part has an intermediate flange and said second spring is in abutment with said flange, and said first-mentioned spring is positioned to hold the forward end of said sleeve part in abutment with the positioning edge of said sleeve nut.

No references cited.

M. CARY NELSON, *Primary Examiner.*